W. JUNKER.
DEVICE FOR SKINNING POTATOES AND THE LIKE.
APPLICATION FILED AUG. 30, 1916.
1,234,767.
Patented July 31, 1917.
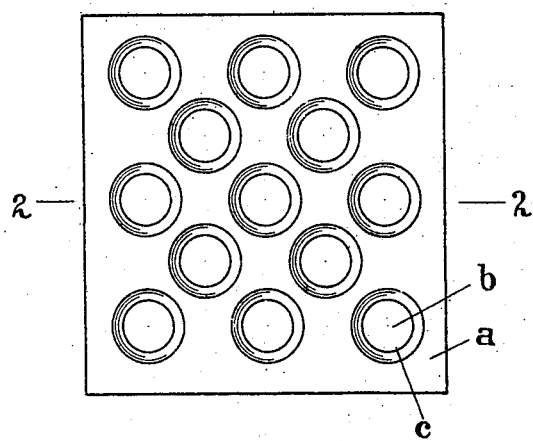
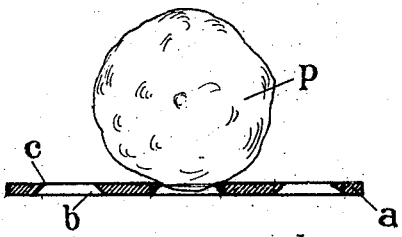
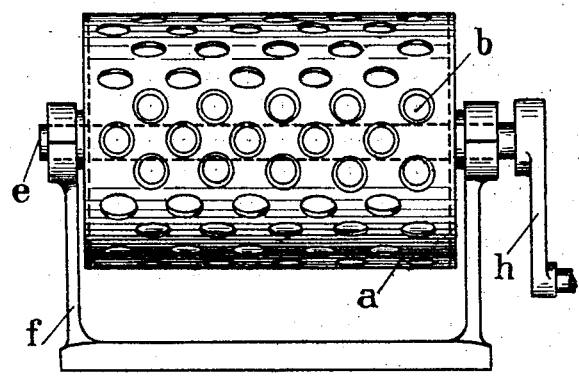
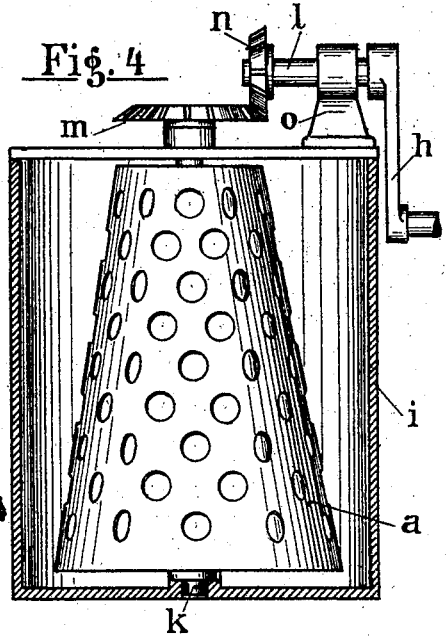
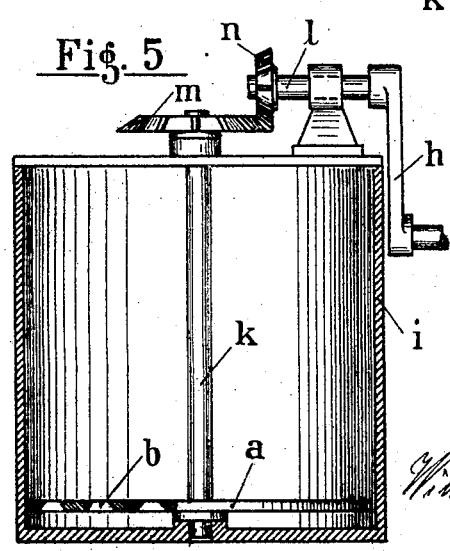

UNITED STATES PATENT OFFICE.

WILHELM JUNKER, OF BRUNSWICK, GERMANY.

DEVICE FOR SKINNING POTATOES AND THE LIKE.

1,234,767. Specification of Letters Patent. Patented July 31, 1917.

Application filed August 30, 1916. Serial No. 117,790.

*To all whom it may concern:*

Be it known that I, WILHELM JUNKER, innkeeper, citizen of the Duchy of Brunswick, Empire of Germany, residing at Brunswick, Germany, have invented certain new and useful Improvements in Devices for Skinning Potatoes and the like, of which the following is a specification.

My present invention generally relates to devices for skinning potatoes and the like, and more particularly to a skinning member to be applied in connection with a suitable device for skinning potatoes. The object of my invention is to provide a skinning member of an improved structure which will skin the potato more effectively than those hitherto known and applied to the same end. A more particular object of my invention is to provide a skinning member which is adapted to act upon the articles to be skinned so that the skin will be separated by a cutting action instead of by abrasion. These and other objects such as will appear from the description hereinafter, are attained by structural features which I will now set forth with reference to the accompanying drawings in which I have illustrated some practical embodiments of my invention which however, as will be understood, are susceptible of changes in details and arrangements without, thereby, involving a departure from the scope of my invention.

Figure 1 is a plan view of the improved skinning member, looking toward its rear side or inoperative face; while Fig. 2 is a sectional view on the line 2—2 of Fig. 1. Fig. 3 illustrates one form of a potato skinning apparatus in elevation, while Figs. 4 and 5 show modified constructions in cross sectional views.

The novel skinning member $a$ is shown to consist of a plate- or sheet-like structure provided with a plurality of passages $b$ each of which is of the form of a frustum of a cone. I prefer to make the angle at the base of the cone small. According to my invention the edges $c$ of the smaller or upper openings of the passages $b$ are made as knife-edges for the purpose of producing a cutting action upon any potato when the same is placed directly upon the smaller opening of the said passages so as to protrude through the latter to a slight extent only, as illustrated in Fig. 2. The knife-edges $c$ act in the plane of the upper surface of the plate $a$ and cut the skin off instead of rubbing the same away which is the way the potato is deprived of its skin in the machines hitherto known.

In carrying the invention into effect, it is desirable to impart motion not only to the potato to be treated but also to the skinning member, in order to obtain the cutting effect in a most complete manner. This may be accomplished in various ways and by various means. Some practical embodiments of the invention, I have shown in Figs. 3 to 5 by way of example.

In the form of skinning apparatus illustrated in Fig. 3, the skinning member $a$ is shown to be of the shape of a drum which is mounted on an axle $e$ revolubly supported in suitable bearings of the machine frame $f$. At the end of the axle $e$, an operating handle $h$ is secured thereto by means of which the drum $a$ may be revolved when filled with potatoes to be skinned. The potatoes may be fed into the interior of the skinning drum through doors, not shown, provided in the sides of the drum. When the charged drum $a$ is being revolved, the potatoes are caused to successively present every portion of their surface to the cutting action of the operative edges $c$ of the passages $b$ until the potatoes are entirely deprived of their skin.

In the modified construction of a potato skinner, shown in Fig. 4, the skinning member $a$ is of the shape of a frustum of a cone with the novel cutting edges $c$ within the outer surface. The cone $a$ is mounted upon a vertical axle or shaft $k$ which at its upper terminal carries a bevel wheel $m$ meshing with another bevel wheel $n$ which is secured upon a short shaft $l$. This latter shaft is revolubly supported in the bearing $o$ and is adapted to be revolved by means of the operating handle $h$. The skinning member $a$ is inclosed in a casing $i$ into which the potatoes to be treated are fed. Gravital action causes the potatoes to come in contact with the cutting edges of the skinning member $a$.

Instead of being of the shape of a cone the skinning member may be of the form of a disk as shown in Fig. 5. The apparatus shown in Fig. 5 acts similarly to the apparatus shown in Fig. 4.

Although I have shown the machines used for the illustration of the invention to be provided with handles for manual actuation, any appropriate motive power may be applied for the operation of the machines in any suitable manner, such as will readily occur to those skilled in the art to which my invention appertains.

My novel skinning member owing to its very simple structure is easy to manufacture and may be readily resharpened by working the passages with a grater.

What I claim as my invention and desire to secure by Letters Patent of the United States, is:—

A device for skinning or peeling potatoes and other spheroidal articles, comprising, in combination, a single rotary operating member with one surface of which the potatoes are maintained in direct contact while the device is in use; said member being constructed of sheet-like material and having circular openings therein which terminate in cutting edges lying wholly within the plane of said contact surface, and which are of such a size as to permit the potatoes to project therethrough to a slight extent only, so as to enable said edges to contact with the potatoes uniformly throughout the entire circumference of said openings, and means for causing said member to support the potatoes or articles while being operated upon.

In testimony whereof I have hereunto set my hand in presence of two subscribing witnesses.

WILHELM JUNKER.

Witnesses:
JULIUS FICHTNER,
FERDINAND WREDE.

Copies of this patent may be obtained for five cents each, by addressing the "Commissioner of Patents, Washington, D. C."